(12) United States Patent
Bowe

(10) Patent No.: US 7,109,248 B2
(45) Date of Patent: Sep. 19, 2006

(54) CONVERTING NATURAL GAS TO LONGER-CHAIN HYDROCARBONS

(75) Inventor: Michael Joseph Bowe, Preston (GB)

(73) Assignee: GTL Microsystems AG, Baar (CH)

( * ) Notice: Subject to any disclaimer, the term of this patent is extended or adjusted under 35 U.S.C. 154(b) by 0 days.

(21) Appl. No.: 11/078,636

(22) Filed: Mar. 14, 2005

(65) Prior Publication Data

US 2005/0209348 A1  Sep. 22, 2005

(30) Foreign Application Priority Data

Mar. 16, 2004  (GB)  ................................. 0405796.4

(51) Int. Cl.
*C07C 27/00* (2006.01)
(52) U.S. Cl. ...................... 518/700; 518/702; 518/704; 518/712
(58) Field of Classification Search ................ 508/700; 718/702; 518/704, 700, 702, 712; 422/143, 422/146, 198
See application file for complete search history.

(56) References Cited

U.S. PATENT DOCUMENTS

| 4,207,250 A | 6/1980 | Butter | 260/449.6 R |
| 4,477,595 A | 10/1984 | Madon | 518/715 |
| 5,639,798 A | 6/1997 | Wilson | 518/714 |

| 2002/0120017 A1* | 8/2002 | Bohn et al. | 518/703 |
| 2003/0083390 A1 | 5/2003 | Shah | 518/702 |
| 2003/0114543 A1* | 6/2003 | Zhang et al. | 518/728 |

FOREIGN PATENT DOCUMENTS

| WO | 01/51194 | 7/2001 |
| WO | 03/033131 | 4/2003 |
| WO | 03/033133 | 4/2003 |
| WO | 03/033134 | 4/2003 |
| WO | 03/048034 | 6/2003 |
| WO | 04/078642 | 9/2004 |

OTHER PUBLICATIONS

Yuan-Yuan Ji et al, "Effect of reaction conditions on the product distribution during Fischer-Tropsch synthesis over an industrial Fe-Mn catalyst," Applied Catalysis A: General, 214 (2001), pp. 77-86.

* cited by examiner

*Primary Examiner*—J. Parsa
(74) *Attorney, Agent, or Firm*—William H. Holt

(57) ABSTRACT

Natural gas is processed to generate longer-chain hydrocarbons, the process comprising subjecting the gas to steam reforming to generate a mixture of carbon monoxide and hydrogen, and then subjecting this mixture to Fischer-Tropsch synthesis. The Fischer-Tropsch synthesis is performed at an elevated temperature above 230° C. and with a gas hourly space velocity greater than 10 000 hr$^{-1}$ so as to achieve a selectivity to the production of C5+ hydrocarbons that is less than 65%. The resulting liquid product can be used as a vehicle fuel, while the tail gases may be used to generate electricity.

6 Claims, 2 Drawing Sheets

CONVERTING NATURAL GAS TO LONGER-CHAIN HYDROCARBONS

This invention relates to a chemical process for converting methane to longer-chain hydrocarbons, and to a plant including catalytic reactors suitable for use in performing the process.

A process is described in WO 01/51194 and WO 03/048034 (Accentus plc) in which methane is reacted with steam, to generate carbon monoxide and hydrogen in a first catalytic reactor; the resulting gas mixture is then used to perform Fischer-Tropsch synthesis in a second catalytic reactor. The overall result is to convert methane to hydrocarbons of higher molecular weight, which are usually liquid under ambient conditions. The two stages of the process, steam/methane reforming and Fisher-Tropsch synthesis, require different catalysts, and catalytic reactors are described for each stage. The catalytic reactors enable heat to be transferred to or from the reacting gases, respectively, as the reactions are respectively endothermic and exothermic; the heat required for steam/methane reforming may be provided by combustion. However, the Fischer-Tropsch synthesis produces hydrocarbons of a range of different chain lengths that will include waxy materials; there are some circumstances where this may not be desirable.

According to the present invention there is provided a process for processing natural gas to generate longer-chain hydrocarbons, the process comprising subjecting the gas to steam reforming to generate a mixture of carbon monoxide and hydrogen, and then subjecting this mixture to Fischer-Tropsch synthesis, wherein the Fischer-Tropsch synthesis is performed at an elevated temperature above 230° C. and with a gas hourly space velocity greater than 10 000 $hr^{-1}$ so as to achieve a selectivity to the production of C5+ hydrocarbons that is less than 65%, and a conversion of carbon monoxide that is no greater than 75%.

Preferably the Fischer-Tropsch synthesis is performed at a pressure in the range 17–21 atmospheres (this being the absolute pressure). With this comparatively low pressure, and the high temperature, the chain growth probability factor ($\alpha$) is only about 0.6 to 0.7. Consequently the hydrocarbons are primarily short chain: the term C5+ refers to the hydrocarbons containing five or more carbon atoms. Operation in this mode therefore generates a significant proportion of hydrocarbons that are gaseous under ambient conditions; but on the other hand it ensures that the proportion of waxy hydrocarbons (say above C17) is less than 1% of the product. Consequently the liquid hydrocarbons produced by condensing the products of the Fischer-Tropsch synthesis can be used directly as a vehicle fuel without requiring further chemical processing. The operating temperature is higher than would conventionally be appropriate, and the reaction kinetics increase rapidly with temperature, so it is necessary to operate at a high space velocity to restrict the production of water and the associated risk of damaging the catalyst.

The conversion of carbon monoxide to hydrocarbons may be in the range 60% to 75%. This ensures that the proportion of water vapour does not reach the levels at which hydrothermal ageing of the catalyst is likely. Somewhat greater carbon monoxide conversion can be obtained by condensing and separating the liquids formed by the Fischer-Tropsch synthesis, and then subjecting the remaining gases to a further Fischer-Tropsch synthesis at the same operating conditions. Condensing and removing the water in this way hence has the benefit of avoiding hydrothermal ageing of the catalyst.

The process also generates a tail gas that contains hydrogen and a significant proportion of gaseous hydrocarbons. Preferably at least part of this tail gas is used to generate electricity, for example as fuel for a turbine used to drive a generator. This provides electric power not only for operating the process, for example to compress the gases to a suitable pressure for the Fischer-Tropsch synthesis, but also provides excess electric power for other purposes. For example, some of the electric power may be used to produce pure water either for use in the steam/methane reforming, or for other purposes such as drinking; this may entail for example reverse osmosis or vacuum evaporation to treat brackish water or salt water. The tail gas may also be processed by metal membrane or pressure swing absorption technology to generate relatively pure hydrogen gas, for example for use in fuel cells.

Preferably both the steam/methane reforming reaction and the Fischer-Tropsch synthesis are performed using compact catalytic reactors. Such a catalytic reactor defines a plurality of first and second gas flow channels arranged alternately to ensure good thermal contact between the gases in them. For example it may comprise a plurality of flat metal sheets in a stack, with grooves which define the first and second gas flow channels. Alternatively the channels may be defined by castellated sheets stacked alternately with flat sheets. Appropriate catalysts should be provided, depending on the required reaction. To ensure the required good thermal contact, in the case of the steam/methane reforming reactor both the first and the second gas flow channels are preferably less than 5 mm in the direction normal to the sheets, more preferably less than 3 mm deep; in the case of the Fischer-Tropsch reactor the channels for the reactions are preferably less than 10 mm deep. Corrugated or dimpled metallic foils, metal meshes, or corrugated or pleated metal felt sheets may be used as the substrate of a catalyst structure within the flow channels to enhance heat transfer and catalyst surface area. These catalyst structures are preferably removable from the grooves in the stack, so they can be replaced if the catalyst becomes spent.

Reactors of this type provide short diffusion path lengths, so that the heat and mass transfer rates can be high, and so the rates of chemical reactions can be high. Such a reactor can therefore provide a high power density. Consequently the reactors can be comparatively small and light, and can be transportable for example in standard ISO containers, so the process can be performed using mobile equipment. For example a plant to produce 200 barrels of fuel a day would not require any components too large to fit in a half-size ISO container. The reactors might also be installed in a remote place (where natural gas and brackish or salt water are found), providing an integrated way of supplying people with vehicle fuel, electricity and drinking water.

The present invention also provides a plant for processing natural gas to generate longer-chain hydrocarbons, the plant incorporating reactors as described above, and the plant operating as described so as to generate a vehicle fuel directly, and to generate tail gas that contains a significant proportion of short-chain hydrocarbons.

The invention will now be further and more particularly described, by way of example only, and with reference to the accompanying drawings, in which.

The invention relates to a chemical process for converting natural gas (primarily methane) to longer chain hydrocarbons so as to provide a liquid fuel that can be used without significant further processing. The first stage involves steam reforming, that is to say the reaction of the type:

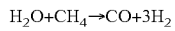

This reaction is endothermic, and may be catalysed by a rhodium or platinum/rhodium catalyst in a first gas flow channel. The heat required to cause this reaction may be provided by combustion of an inflammable gas such as methane or hydrogen, which is exothermic and may be catalysed by a palladium catalyst in an adjacent second gas flow channel. In both cases the catalyst is preferably on a stabilised-alumina support which forms a coating typically less than 100 µm thick on the metallic substrate. Both these reactions may take place at atmospheric pressure, although alternatively the reforming reaction might take place at an elevated pressure. The heat generated by the combustion would be conducted through the metal sheet separating the adjacent channels.

The gas mixture produced by the steam/methane reforming is then used to perform a Fischer-Tropsch synthesis to generate a longer chain hydrocarbon, that is to say:

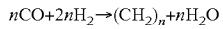

which is an exothermic reaction, occurring at an elevated temperature, typically between 230 and 280° C., for example 240° C., and an elevated pressure typically between 1.7 MPa and 2.1 MPa (absolute values), for example 1.8 MPa, in the presence of a catalyst such as iron, cobalt or fused magnetite, with a potassium promoter. The preferred catalyst for the Fischer-Tropsch synthesis comprises a coating of gamma-alumina of specific surface area 140–230 $m^2/g$ with about 10–40% cobalt (by weight compared to the alumina), and with a promoter such as ruthenium, platinum or gadolinium which is less than 10% the weight of the cobalt. The gas hourly space velocity is very high, for example 20 000 $h^{-1}$ (this being the volume of gas supplied to the reactor per hour, measured at standard temperature and pressure, as a multiple of the free volume of the reactor), to suppress the conversion of carbon monoxide and the associated production of water vapour.

Figure 1:
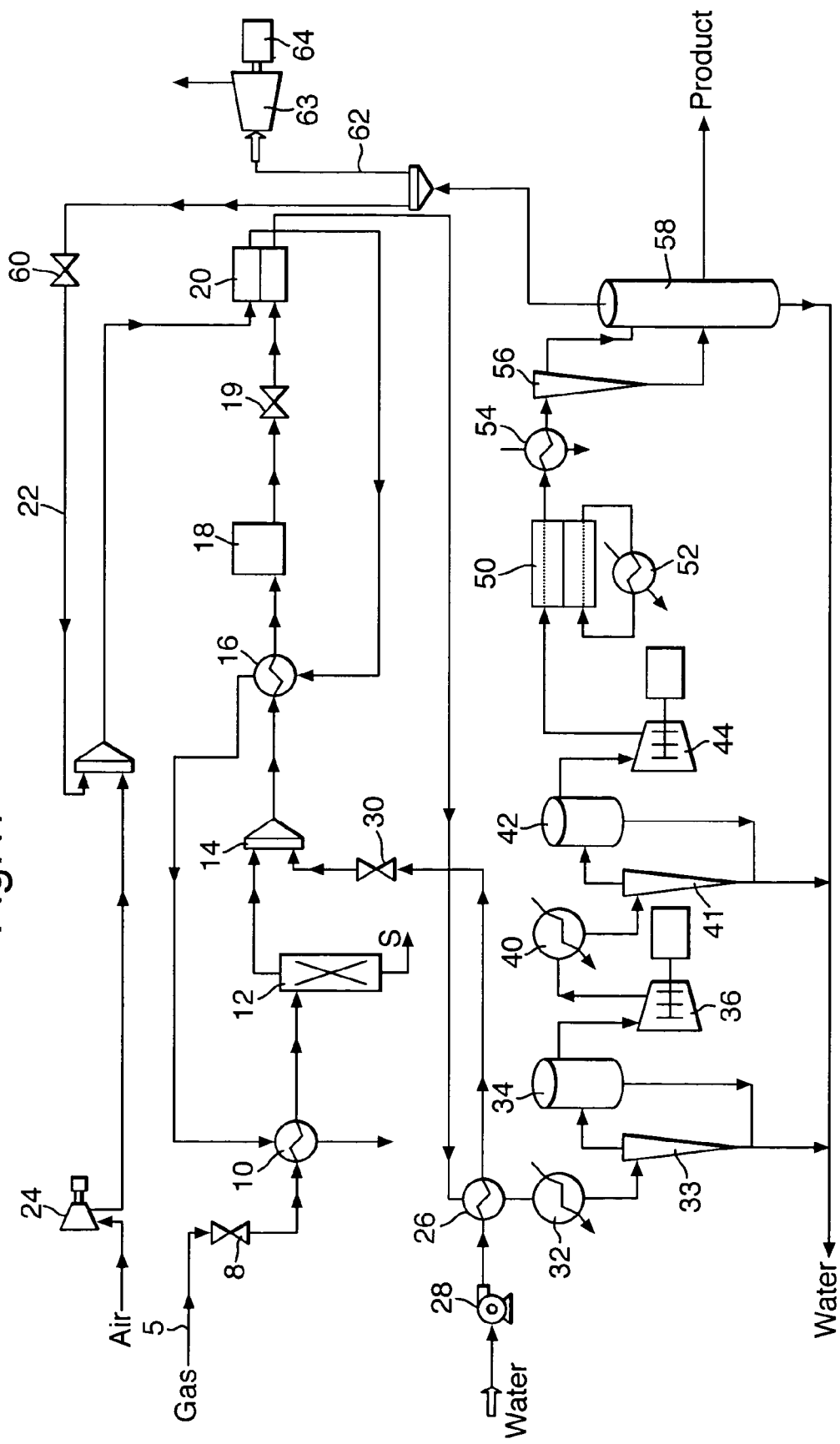
FIG. 1 shows a flow diagram of a chemical process of the invention.

Referring now to FIG. 1, the overall chemical process is shown as a flow diagram in which the components of the plant are shown. The natural gas feed 5 consists primarily of methane with, in this example, a percentage of higher hydrocarbons $C_2$ to $C_{11}$. Typically these higher hydrocarbons are present at up to 10% v/v depending on the source of natural gas.

The gas pressure is regulated by a valve 8 and then the gas 5 is pre-heated to about 400° C. in a heat exchanger 10 using the hot exhaust gas from catalytic combustion, and is then fed to a solid bed de-sulphurising system 12 that reduces the sulphur content in the gas to 0.1 ppm or less. The de-sulphurised natural gas 5 is then mixed with steam, for example in a fluidic vortex mixer 14. The gas/steam mixture is heated in a heat exchanger 16 using the hot exhaust gas from catalytic combustion so that the gas mixture is at a temperature of 500° C. The mixture enters an adiabatic fixed bed pre-reformer 18 where it contacts a nickel or a platinum/rhodium based methanation catalyst. The pre-reformer 18 may operate in the pressure range 5–12 bar(a) (ie 5–12 atmospheres absolute pressure). The higher hydrocarbons react with the steam to form methane and CO.

The gas exits the pre-reformer 18 at a lower temperature typically 450° C. The pressure is let down by a valve 19 to preferably 3–7 bar(a) and more preferably to 4–5 bar(a) before entering a reformer 20. The reformer 20 is a compact catalytic reactor of the type described above, made from a stack of plates which define flow paths for endothermic and exothermic reactions which are in good thermal contact, and which contain appropriate catalysts on corrugated metal foil supports. The reformer channels in the reformer 20 contain a platinum/rhodium catalyst, and the steam and methane react to form carbon monoxide and hydrogen. The temperature in the reformer increases from 450° C. at the inlet to about 800–850° C. at the outlet. The flow rates of steam and gas supplied to the mixer 14 are such that the steam: carbon molar ratio fed to the reformer 20 is between 1.2–1.6 and preferably between 1.3 and 1.5. Depending on the higher hydrocarbon content of the gas 5, the steam to carbon ratio at the inlet to the pre-reformer 18 may need to be higher than this.

The heat for the endothermic reactions in the reforming reactor 20 is provided by the catalytic combustion of a mixture of short chain hydrocarbons and hydrogen which is the tail gas 22 from the Fischer-Tropsch synthesis; this tail gas 22 is combined with a flow of air provided by an air blower 24. The combustion takes place over a palladium platinum catalyst within adjacent flow channels within the reforming reactor 20. The combustion gas path is co-current relative to the reformer gas path. The catalyst may include gamma-alumina as a support, coated with a palladium/platinum mixture 3:1, which is an effective catalyst over a wide temperature range. The combustible gas mixture may be supplied in stages along the reactor 20 to ensure combustion occurs throughout the length of the combustion channels.

A mixture of carbon monoxide and hydrogen at above 800° C. emerges from the reformer 20 and is quenched to below 400° C. by passing it through a steam-raising heat exchanger 26. Water is supplied to this heat exchanger 26 by a pump 28, and the steam for the reforming process is hence supplied through a control valve 30 to the mixer 14. The gas mixture is further cooled in a heat exchanger 32 with cooling water to about 60° C., so the excess water condenses and is separated by passage through a cyclone 33 and a separator vessel 34. The gas mixture is then compressed by a compressor 36 to about twice the pressure, and is again cooled by a heat exchanger 40 before passing through a second cyclone 41 and a separator vessel 42 to remove any water that condenses. The separated water is re-cycled back to the steam raising circuit. The gas is then compressed to 18 atmospheres in a second compressor 44.

The stream of high pressure carbon monoxide and hydrogen is then fed to a catalytic Fischer-Tropsch reactor 50, this again being a compact catalytic reactor formed from a stack of plates as described above; the reactant mixture flows through one set of channels, while a coolant flows through the other set. The gas stream flows at an hourly space velocity in the range 15 000 to 20 000 $hr^{-1}$, and a mean temperature in the range 230–250° C. In the coolant channels a single phase coolant fluid is employed to remove the exothermic heat to maintain the temperature in the Fischer-Tropsch reaction channels as close to isothermal as possible. The coolant fluid is recirculated, its temperature being maintained at the required value by heat exchange with ambient air through a forced draft air cooler 52.

The reaction products from the Fischer-Tropsch synthesis, predominantly water and paraffins $C_{17}$ and below, are cooled to condense the liquids (including the desired fuel fraction) by passage through a heat exchanger 54 and a cyclone separator 56 followed by a separating chamber 58 in which the three phases water, hydrocarbons and tail gases separate, and the fuel product is degassed at atmospheric temperature and pressure. The hydrocarbons that remain in the gas phase and excess hydrogen gas (the Fischer-Tropsch tail gases 22) are collected and split. A proportion passes through a pressure reduction valve 60 to provide the fuel for the catalytic combustion process in the reformer 20 (as described above). The remaining tail gases 62 are fed to a gas turbine 63 which drives an electrical power generator 64.

The gas turbine 64 generates all the power for the plant and has the capacity to export a surplus. The major plant electrical power needs are the compressors 36 and 44, and the pumps 24 and 28; electricity may also be used to operate a vacuum distillation unit to provide process water for steam generation and to provide drinking water.

Figure 2:
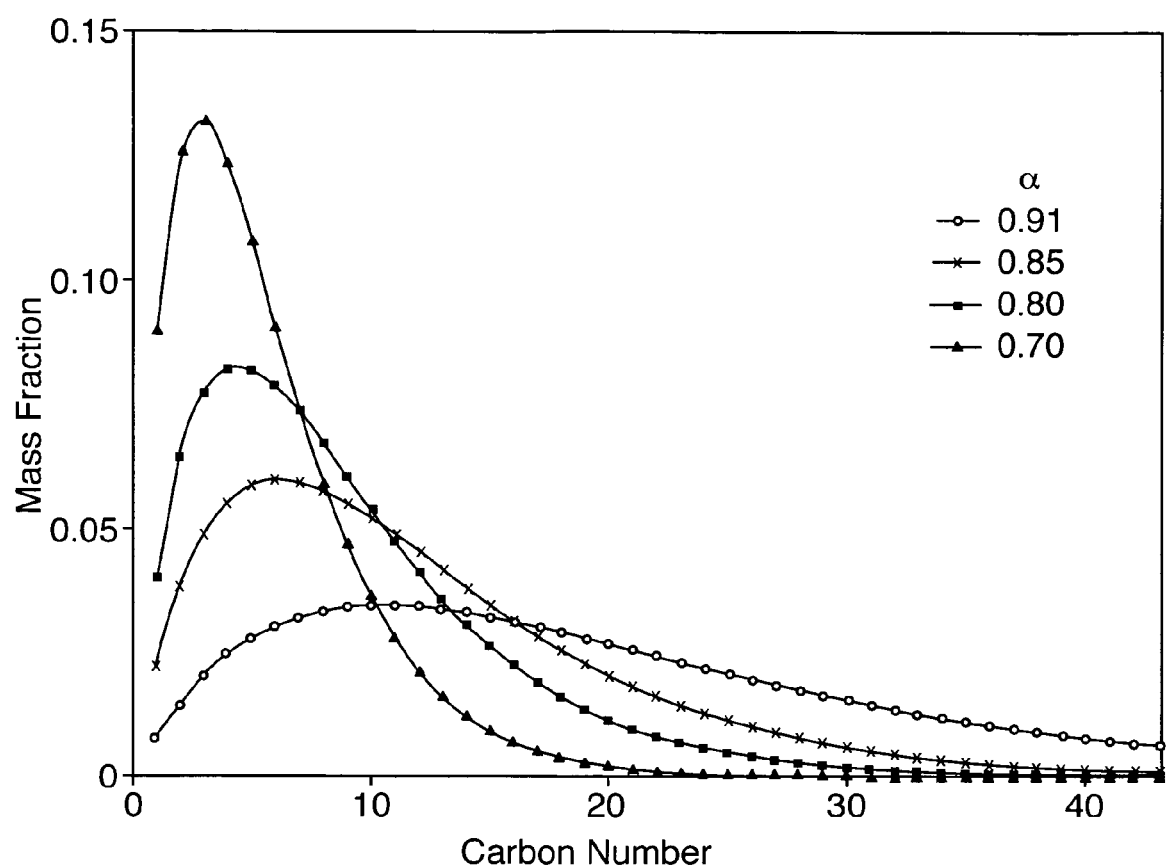
FIG. 2 shows graphically the mass fraction distributions for different values of $\alpha$.

The hydrocarbon products produced by Fischer-Tropsch synthesis depend upon the chain growth probability factor ($\alpha$); the larger this probability factor, the higher the proportion of the product at longer chain lengths. Referring to FIG. 2, this shows graphically the mass fraction for different chain lengths (carbon number), for a range of different values of $\alpha$. This distribution is known as the Anderson-Schultz-Flory distribution, and can be represented by the equation:

$$Mn = n(1-\alpha)^2 \alpha^{n-1}$$

where Mn is the mass fraction of a carbon chain of length n. The value of $\alpha$ is affected by the reaction temperature, and by the pressure. In the present example, the reaction temperature is held at about 240° C., and pressure is 1.8 MPa. This leads to a comparatively low value of $\alpha$ of about 0.6–0.7, so that the highest mass fractions are those of hydrocarbons that are gases under ambient conditions—methane, ethane, propane, butane—and which therefore emerge in the tail gases. On the other hand, the mass fraction of long chain hydrocarbons above about C22 is negligible.

It will be appreciated, from the equations discussed above, that the steam reforming stage forms more hydrogen than is required for the Fischer-Tropsch synthesis. Consequently the tail gases 22 contain a significant quantity of hydrogen, as well as the lower alkanes (say C1 to C5). However, because of the comparatively low conversion of carbon monoxide, the tail gases 22 also contain a significant quantity of carbon monoxide. They can therefore be subjected to a second Fischer-Tropsch synthesis by passage through a second such reactor (not shown), so that the overall carbon monoxide conversion is increased, and somewhat more of the desired product is obtained.

The product from the separator 58 is a liquid, most of which consists of hydrogen-saturated linear alkanes; the average carbon chain length is about 8, and the chain lengths range between about 6 and 17. Consequently it is substantially equivalent to the aircraft fuel known as JP-8.

It will be appreciated that by modifying the operating parameters for the Fischer-Tropsch reactor 50, the properties of the resulting liquid phase output can be modified so as to produce a different type of fuel such as diesel.

I claim:

1. A process for processing natural gas to generate longer-chain hydrocarbons, the process comprising subjecting the gas to steam reforming to generate a mixture of carbon monoxide and hydrogen, and then subjecting this mixture to Fischer-Tropsch synthesis in a reactor comprising a plurality of metal sheets in a stack, defining flow channels for the reaction and flow channels for a coolant, the channels being in good thermal contact with each other, wherein the Fischer-Tropsch synthesis is performed at an elevated temperature above 230° C. and with a gas hourly space velocity greater than 10,000 hr$^{-1}$ so as to achieve a selectivity to the production of C5+hydrocarbons that is less than 65%, and a conversion of carbon monoxide that is no greater than 75%.

2. A process as claimed in claim 1 wherein the Fischer-Tropsch synthesis is performed at a pressure in the range 17–21 atmospheres.

3. A process as claimed in claim 1 wherein the output from the Fischer-Tropsch synthesis is separated by condensation into a liquid phase and a tail gas, and at least part of this tail gas is used to generate electricity.

4. A process as claimed in claim 3 wherein the electricity provides power to compress the gas mixture to a suitable pressure for the Fischer-Tropsch synthesis.

5. A process as claimed in claim 4 wherein electric power is also used to produce pure water suitable for use in the steam/methane reforming step.

6. A process for processing natural gas to generate longer-chain hydrocarbons, the process comprising subjecting the gas to steam reforming to generate a mixture of carbon monoxide and hydrogen, and then subjecting this mixture to Fischer-Tropsch synthesis in a reactor comprising a plurality of metal sheets in a stack, defining flow channels for the reaction and flow channels for a coolant, the channels being in good thermal contact with each other, wherein the Fischer-Tropsch synthesis is performed at an elevated temperature above 230° C. and with a gas hourly space velocity greater than 10,000 hr$^{-1}$ so as to achieve a chain growth probability factor ($\alpha$) not more than 0.7, and a conversion of carbon monoxide that is no greater than 75%.

* * * * *